United States Patent
Cooper

(10) Patent No.: US 6,606,398 B2
(45) Date of Patent: *Aug. 12, 2003

(54) AUTOMATIC CATALOGING OF PEOPLE IN DIGITAL PHOTOGRAPHS

(75) Inventor: Frederick J. Cooper, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,501

(22) Filed: Sep. 30, 1998

(65) Prior Publication Data

US 2001/0043727 A1 Nov. 22, 2001

(51) Int. Cl.⁷ .................................. G06K 9/00
(52) U.S. Cl. ................ 382/118; 382/115; 382/305
(58) Field of Search ................ 382/103, 118, 382/115, 305, 307, 306; 235/487; 358/448, 450, 403, 404, 453, 527

(56) References Cited

U.S. PATENT DOCUMENTS

| | | | | |
|---|---|---|---|---|
| 4,230,321 A | * | 10/1980 | Smith | 273/308 |
| 5,041,921 A | * | 8/1991 | Scheffler | 360/13 |
| 5,375,195 A | * | 12/1994 | Johnston | 345/630 |
| 5,432,864 A | * | 7/1995 | Lu et al. | 382/118 |
| 5,450,504 A | * | 9/1995 | Calia | 382/227 |
| 5,469,512 A | * | 11/1995 | Fujita et al. | 382/118 |
| 5,497,430 A | * | 3/1996 | Sadovnik et al. | 382/156 |
| 5,513,130 A | * | 4/1996 | Redmond | 703/2 |
| 5,734,794 A | * | 3/1998 | White | 704/275 |
| 5,764,790 A | * | 6/1998 | Brunelli et al. | 382/115 |
| 5,830,065 A | * | 11/1998 | Sitrick | 465/35 |
| 5,850,470 A | * | 12/1998 | Kung et al. | 382/157 |
| 5,905,807 A | * | 5/1999 | Kado et al. | 382/199 |
| 6,016,148 A | * | 1/2000 | Kang et al. | 345/425 |
| 6,018,774 A | * | 1/2000 | Mayle et al. | 709/250 |
| 6,035,055 A | * | 3/2000 | Wang et al. | 382/190 |
| 6,044,168 A | * | 3/2000 | Tuceryan et al. | 345/430 |
| 6,108,437 A | * | 8/2000 | Lin | 382/118 |
| 6,118,888 A | * | 9/2000 | Chino et al. | 345/705 |
| 6,119,096 A | * | 9/2000 | Mann et al. | 705/5 |
| 6,122,403 A | * | 9/2000 | Rhoads | 382/233 |

* cited by examiner

Primary Examiner—Bhavesh M. Mehta
Assistant Examiner—Sheela Chawan
(74) Attorney, Agent, or Firm—Blakely, Sokoloff, Taylor & Zafman LLP

(57) ABSTRACT

A method for cataloging facial images stores an image associated with at least one facial image in a face database. Each of the facial images is further associated with at least one identification parameter. The method automatically catalogs a new image into the face database according to pre-existing matching facial images located in the face database.

5 Claims, 4 Drawing Sheets

AUTOMATIC CATALOGING OF PEOPLE IN DIGITAL PHOTOGRAPHS

BACKGROUND OF THE INVENTION

1. Field of the Invention

The field of the invention is cataloging of images, more specifically, the method and apparatus of the present invention is the automatic cataloging of images in digital photographs and digital video.

2. Related Art

Images captured on a digital photograph or a digital video are typically either stored away on their own or as part of a database. Image databases currently available either require a user to enter information about each image added to the database or force the user to locate a picture of a person at the time of a query.

More specifically, currently available methods for organizing images include digital photo albums which require the user to enter keyword information each time a new picture is being entered. The currently available method is time consuming and requires a user to perform redundant tasks when entering images in a database.

It is therefore desirable to have an apparatus and method for automatically cataloging facial images in digital photographs and digital video.

BRIEF SUMMARY OF THE INVENTION

A method for cataloging facial images stores an image associated with at least one facial image in a face database. Each of the facial images is further associated with at least one identification parameter. The method automatically catalogs a new image into the face database according to pre-existing matching facial images located in the face database.

DETAILED DESCRIPTION OF THE INVENTION

The present invention is a method and apparatus for automatically cataloging images in digital photographs and digital video. The present invention utilizes a combination of face recognition technologies and applies these concepts to a video image database. As new digital photographs or digital videos are entered into a database, they are scanned for faces, and the faces are compared against an existing database of faces. The new facial images matching existing facial images in the database are automatically stored in the database along with a copy of the information associated with the matching pre-existing facial image in the database. Unrecognized faces cause the present invention to query the user for additional data. The user can then query the database on individuals in a single image.

Figure 1:
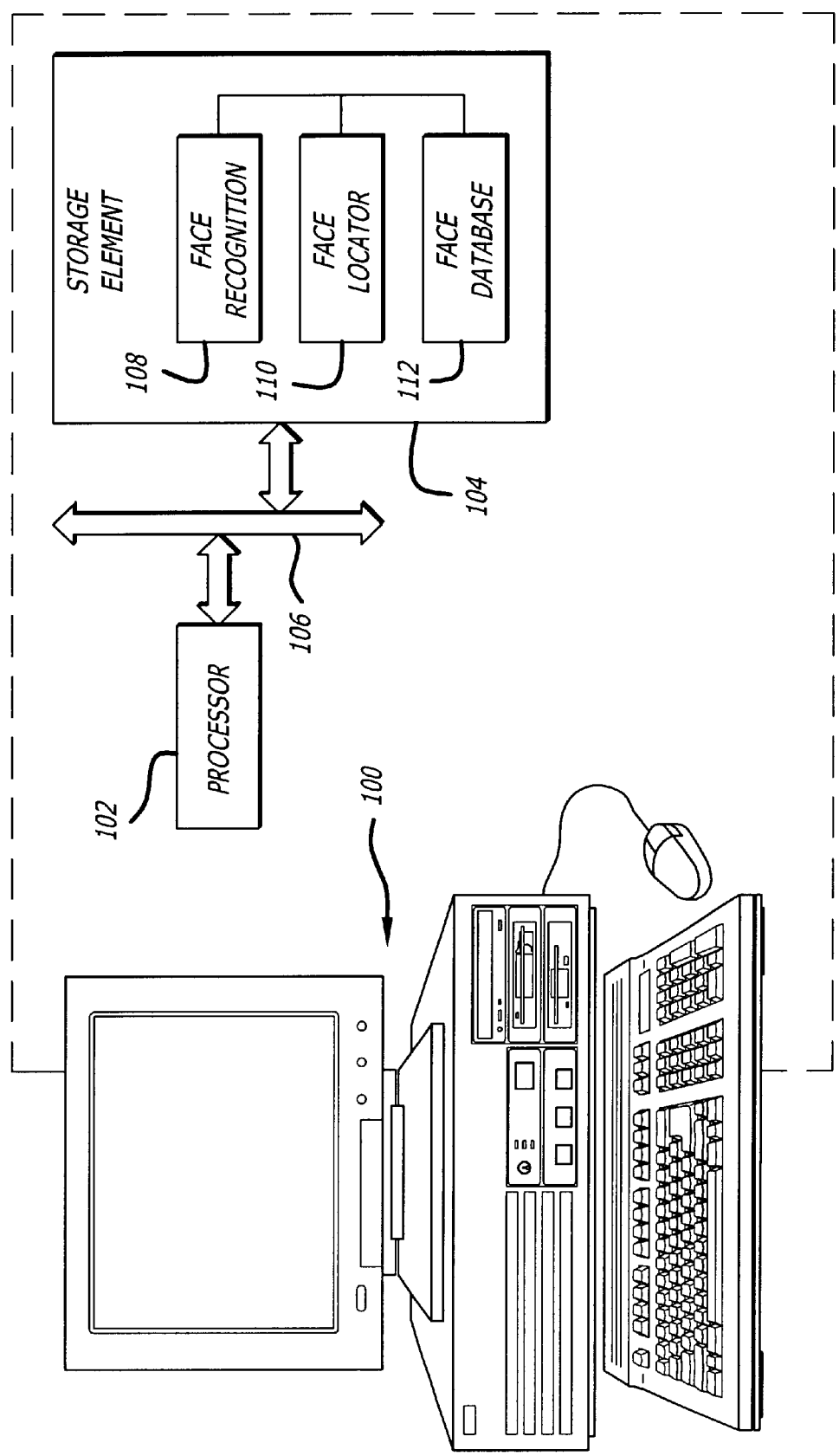
FIG. 1 illustrates exemplary components of the present invention.

FIG. 1 illustrates exemplary components of the present invention. Computer 100 has a processor 102 coupled to a storage element 104 by a bus 106. The storage element 104 has the present invention's face recognition module 108, face locator module 110 and a face database 112. The face recognition module 108 may be comprised of currently available face recognition technology including Face It!™ from Visionics Corporation of Jersey City, N.J.

The face database 112 is configured to hold a catalog of facial images along with identification parameters. The face locator module 110 is configured to search for pre-existing facial images in the face database 112 matching a new facial image entry. The face recognition module 108 is configured to locate facial images in a new entry of digital photograph or digital video. With facial images from digital video, a predetermined number of frames of the digital video is selected (such as one frame every two seconds of running video) as a new entry. The face recognition module 108 locates the facial images in the pre-determined number of frames or a digital photograph for storage in the face database 112.

Figure 2:
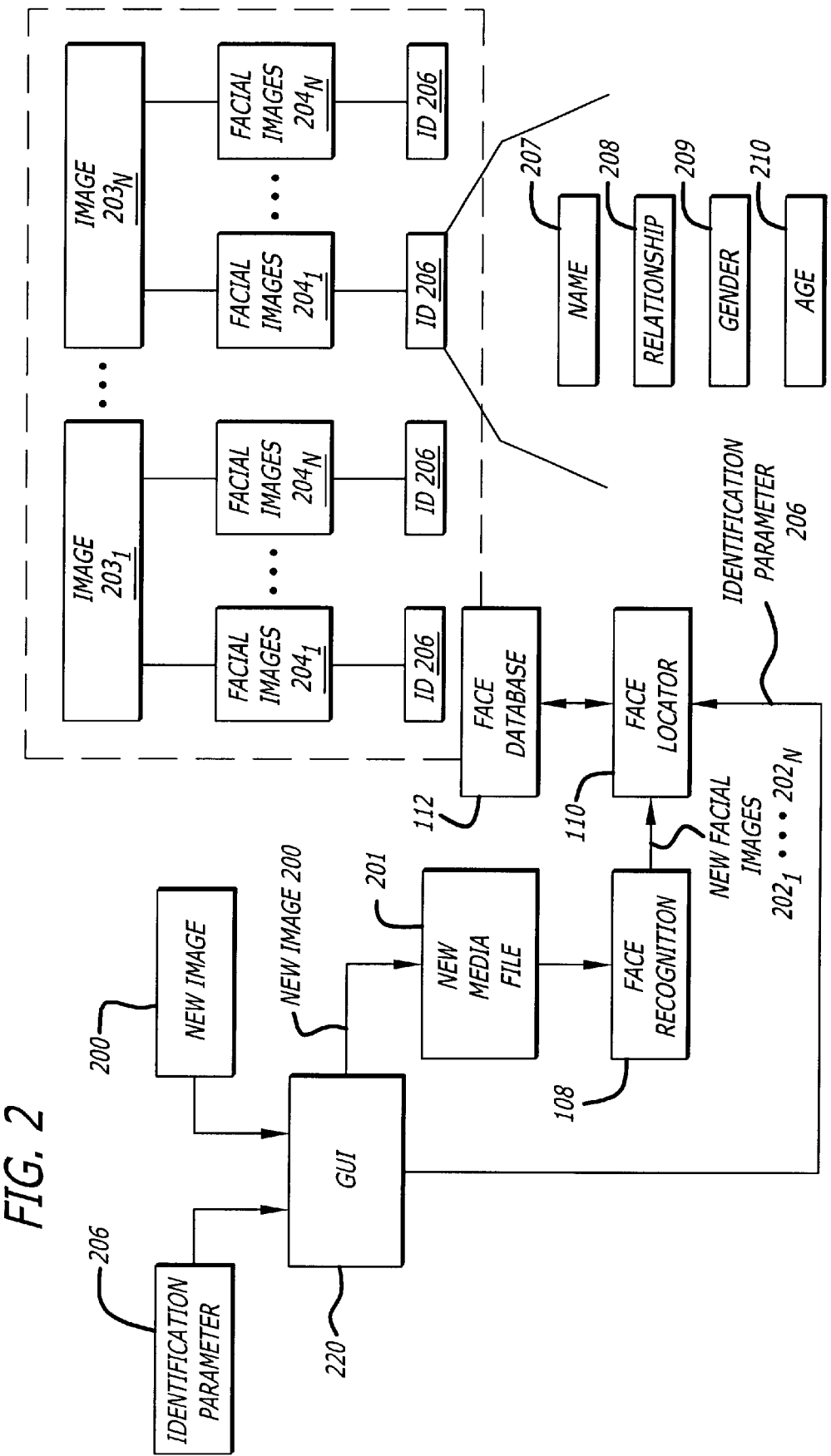
FIG. 2 is a block diagram of the present invention.

FIG. 2 is a block diagram of the present invention. An image 200 including but not limited to a digital photograph or a digital video is input by a user using a graphical user interface (GUI) 220 and stored in a new media file 201. The face recognition module 108 locates the facial images $202_1 \ldots 202_N$ in a given image 200.

A face locator module 110 accesses images $203_1 \ldots 203_N$ having associated facial images $204_1 \ldots 204_N$ from the face database 112 and searches for images in facial images $204_1 \ldots 204_N$ with at least one associated facial image 204 matching a new facial image 202. Each facial image has an associated identification parameter 206. If there is a match, then the new image 200 associated with the new facial image 202 is catalogued into the face database 112. Further, the identification parameters 206 associated with the matching facial image 203 are associated with the new facial image 202. Otherwise, if the new facial image 202 does not have any matching facial image 204 in the face database 112, then the user is prompted for the name of the face in the new facial image 202.

Given the name 207 of the face in the new facial image 202, the face locator module 110 performs a search for a matching name in the face database 112. If a matching name is found, then the new image 200 along with the associated new facial image 202 is added to the face database 112 as one of the face images associated with that name. Otherwise, if a matching name is not found in the face database 112, then the name 207 is associated with the new image 200 along with the new facial image 202 and stored in the face database 112 as a new entry. This process is repeated for every new facial image 202 located in the new image 200 by the face recognition module 108.

In one embodiment, a user may be prompted by the GUI 220 for further identification information to be saved as identification parameters 206 associated with the new facial image 202. The identification parameters 206 may include, but are not limited to a name 207, relationship to user (e.g. friend, uncle, brother) 208, gender 209 and age 210.

If there are more than one matching names in the face database 112, other parameters in the identification parameters 206 maybe used to narrow the search performed by the face locator module 110. More specifically, a user can input a further narrowing identification parameter 206 and the face locator module 110 performs a further search for images having associated facial images $204_1 \ldots 204_N$ matching the selected identification parameter.

Figure 3A:
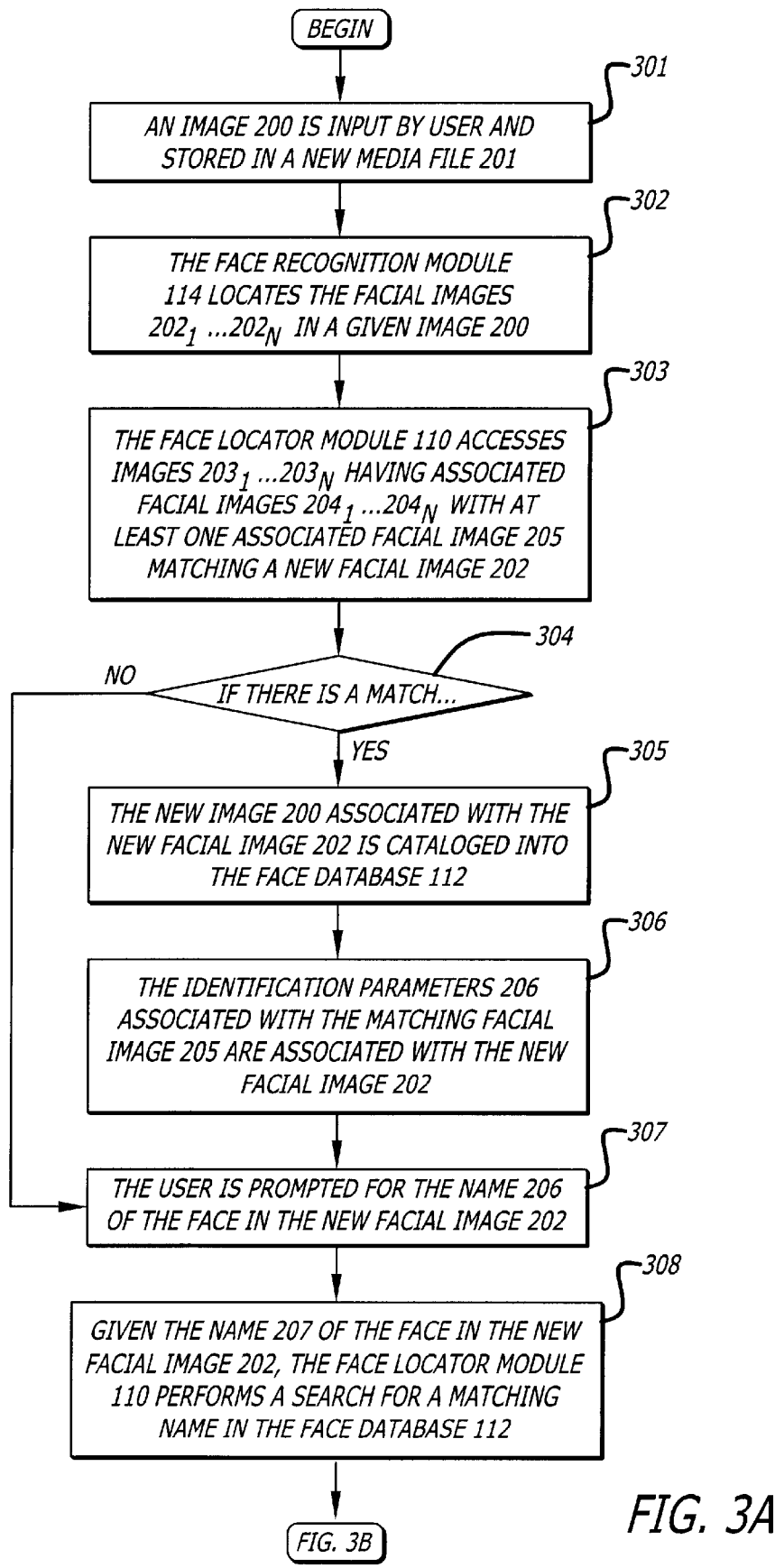
FIGS. 3a and 3b are flow diagrams illustrating the general steps followed by the present invention.
Figure 3B:
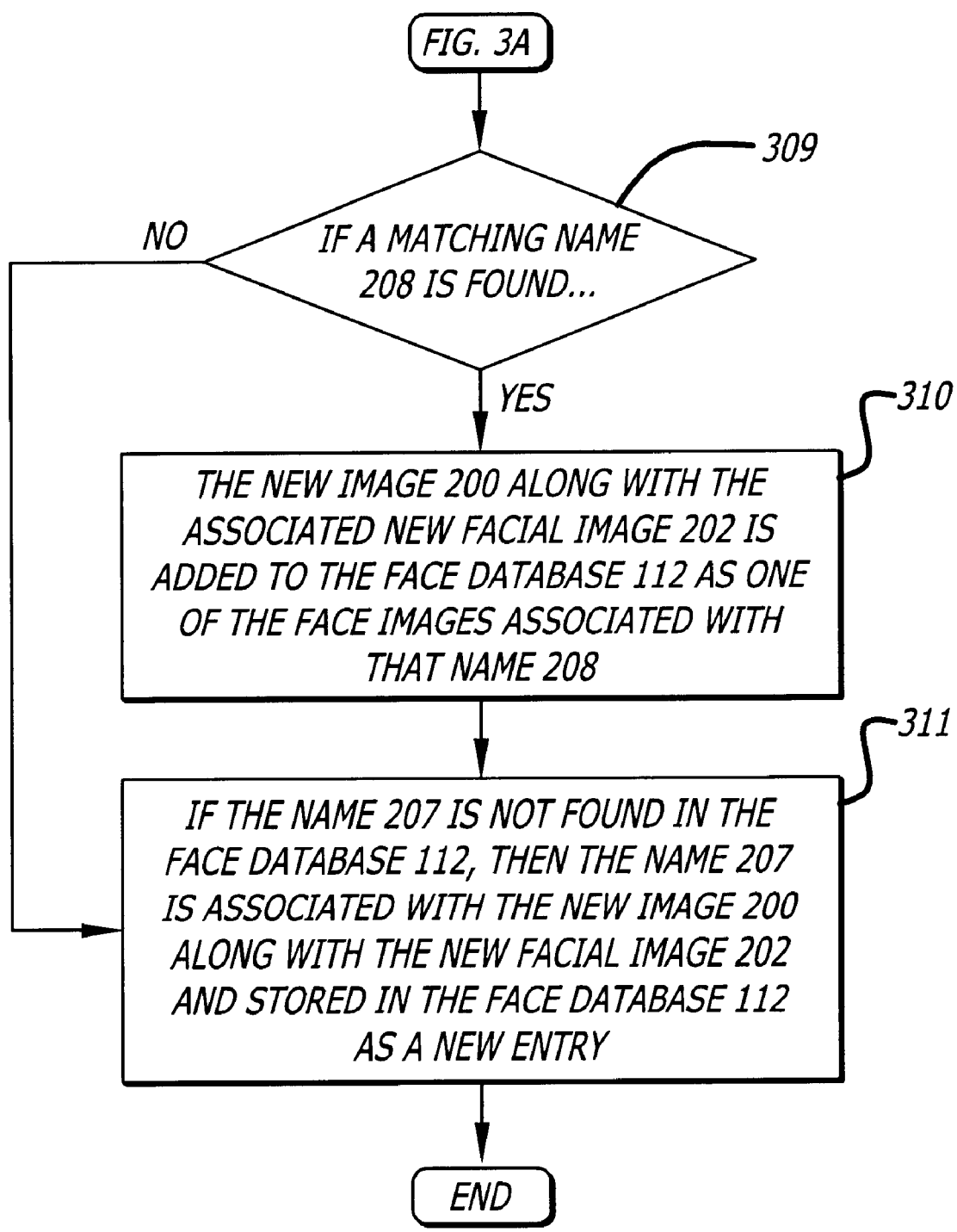

FIGS. 3a and 3b are flow diagrams illustrating the general steps followed by the present invention. In step 301, an image 200 is input by a user and stored in a new media file 201. In step 302, the face recognition module 108 locates the facial images $202_1 \ldots 202_N$ in a given image 200. In step 303, the face locator module 110 accesses images $203_1 \ldots 203_N$ having associated facial images $204_1 \ldots 204_N$ from the face database 112 and searches for images in facial images $204_1 \ldots 204_N$ with at least one associated facial image 204 matching a new facial image 202.

In step 304, if there is a match, then in step 305, the new image 200 associated with the new facial image 202 is cataloged into the face database 112. Further, the identification parameters 206 associated with the matching facial image 204 are associated with the new facial image 202. Otherwise, in step 307, if the new facial image 202 does not have any matching facial image 205 in the face database 112, then the user is prompted for the name 206 of the face in the new facial image 202.

In step 308, given the name 207 of the face in the new facial image 202, the face locator module 110 performs a search for a matching name in the face database 112. In step 309, if a matching name 208 is found, then in step 310, the new image 200 along with the associated new facial image 202 is added to the face database 112 as one of the face images associated with that name 208. Otherwise, in step 311, if the name 207 is not found in the face database 112, then the name 207 is associated with the new image 200 along with the new facial image 202 and stored in the face database 112 as a new entry. This process is repeated for every new facial image 202 located in the new image 200 by the face recognition module 108.

What has been described is a method and apparatus for cataloging facial images in digital photographs and digital video. The present invention utilizes currently available face recognition technology in order to identify faces in a given image, automatically searches a catalog of known faces from matching faces and automatically enters new facial image entries into a face database.

Certain exemplary embodiments have been described in detail and shown in the accompanying drawings. It is to be understood that such embodiments are merely illustrative of and not restrictive on the broad invention, and that this invention not be limited to the specific arrangements and constructions shown and described, since various other modifications may occur to those ordinarily skilled in the art.

What is claimed:

1. A method for creating a digital family album of a particular family comprising:
   (i) receiving the image data;
   (ii) locating a first whole facial image data of a first person within the image data, wherein said first person bears a relationship to said family;
   (iii) matching said first whole facial image data of said first person to an entry of a face database (FDB) as part of said digital family album; and
   (iv) adding the image data to said FDB.

2. The method of claim 1 wherein said entry of said face database in a second whole facial image data of said first person stored along with an identification information associated with said first person.

3. The method of claim 2 wherein said identification information represents the identity of said first person.

4. The method of claim 1 wherein the image data contains a plurality of facial images data.

5. The method of claim 2 wherein said identification information is selected from the group consisting of the name, the age, and the gender of said first person.

\* \* \* \* \*

UNITED STATES PATENT AND TRADEMARK OFFICE
CERTIFICATE OF CORRECTION

PATENT NO. : 6,606,398 B2
DATED : August 12, 2003
INVENTOR(S) : Cooper

It is certified that error appears in the above-identified patent and that said Letters Patent is hereby corrected as shown below:

<u>Column 4,</u>
Line 22, delete "in" and insert -- is --.

Signed and Sealed this

Twenty-fifth Day of November, 2003

JAMES E. ROGAN
*Director of the United States Patent and Trademark Office*